US008458072B1

(12) United States Patent
Collins (10) Patent No.: US 8,458,072 B1
(45) Date of Patent: Jun. 4, 2013

(54) SYSTEM AND METHOD FOR PROVIDING A COMMON DATA AND ANALYTIC FRAMEWORK FOR VALUATING FINANCIAL INSTRUMENTS AND PORTFOLIOS (75) Inventor: Susan Collins, Arlington, VA (US)

(73) Assignee: Fannie Mae, Washington, DC (US)

( * ) Notice: Subject to any disclaimer, the term of this patent is extended or adjusted under 35 U.S.C. 154(b) by 3695 days.

(21) Appl. No.: 10/326,290

(22) Filed: Dec. 23, 2002

Related U.S. Application Data (60) Provisional application No. 60/342,852, filed on Dec. 28, 2001.

(51) Int. Cl.
*G06Q 40/00* (2012.01)
(52) U.S. Cl.
USPC .......................................... 705/36 R; 705/38
(58) Field of Classification Search
USPC ................................................ 705/36, 38 R
See application file for complete search history.

(56) References Cited

U.S. PATENT DOCUMENTS

| | | | | |
|---|---|---|---|---|
| 6,112,181 | A * | 8/2000 | Shear et al. ........................ | 705/1 |
| 6,519,571 | B1 * | 2/2003 | Guheen et al. ................... | 705/14 |
| 2002/0055906 | A1 * | 5/2002 | Katz et al. ........................ | 705/39 |
| 2002/0116282 | A1 * | 8/2002 | Martin et al. .................... | 705/26 |
| 2003/0009368 | A1 * | 1/2003 | Kitts ............................... | 705/10 |
| 2003/0088458 | A1 * | 5/2003 | Afeyan et al. ................... | 705/10 |

OTHER PUBLICATIONS

ArcGIS 8.1: An ESRI White Paper—Jan. 2001 2000 Environmental Systems Research Institute, Inc. pp. i-iii, 1-29.
GIS by ESRI, "What is ArsGIS?" 2001, pp. i-iv, 1-43.
W. Fredrick Limp, "GEOWorld—Quick-Take Reviews," ArcGIS 8.1, Jul. 2001.
ArcGIS 8.1: Overview—Dec. 26, 2001 http://www.esri.com/software/arcgis/overview.html.
ArcGIS 8.1: Key Features—Dec. 26, 2001 http://www.esri.com/software/arcgis/keyfeatures0.html.
MapInfo Professional: "The Leading Desktop Mapping Software for Business and GIS Analysts", 2001.
MapInfo Professional User's Guide: Appendix J: MapInfo Data Interchange Format; pp. 674-693.

* cited by examiner

*Primary Examiner* — Muriel Tinkler
(74) *Attorney, Agent, or Firm* — Rader, Fishman & Grauer PLLC (57) ABSTRACT

A system for determining the capacity of a geographic area to support a specific product by identifying an index of variables associated with potential buyers in the geographic area. The system includes a data gathering component and a processing component. The data gathering component obtains a profile about the product and additional information about similar products from several of sources. The additional information includes identified characteristics of potential buyers. The processing component processes the data by identifying variables that characterize potential buyer, assigns a score to each variable, assigns the variables to the index, determines a formula for the index, executes the formula against information associated with the geographic area, divides the geographic area into sub-groups and analyzes each sub-group to determine the capacity of the geographic area to support the product.

18 Claims, 6 Drawing Sheets

Variable 1 - The number of households between predefined ages in a geographic area Variable 2 - The number of households with predefined income level in a geographic area Variable 3 - The total number of households in a geographic area Variable 4 - The number of renter occupied households in a geographic area Variable 402

First Time Home Buyer Formula = ((HH1/HH) + (2(R/HH) * R))/1000

Where:
HH1 = The number of households in a geographic area that are headed by occupants between predefined ages with predefined income levels HH = The total number of households in the geographic area R = The number of renter-occupied households in the geographic area Formula 404

Fig. 4

Variable 1 - The number of households in a geographic area between predefined ages Variable 2 - The number of single unit structures in the geographic area Variable 3 - The number of households in the geographic area that owned homes for longer than a predefined time period Variable 4 - The total number of households in the geographic area Variable 502

---

Reverse Mortgage Formula = ((2(HH2/HH) + 3(HH3/HH) + 2(OO)/HH) + 2(HH4/HH) + SU/(HH)*HH3))/1000

Where:
HH2 = The number of households in a geographic area that are headed by occupants between predefined ages HH3 = The number of households in a geographic area that are headed by occupants over a predefined age HH4 = The number of units that the owner occupied for more than a predefined period HH = The total number of households in the geographic area OO = The total number of owner-occupied households in the geographic area SU = The number of single unit structures in the geographic area Formula 504

Fig. 5

Variable 1 - The median home value in a geographic area

Variable 2 - The median household income in the geographic area

Variable 602

Affordable Housing Formula:
If  HV / HI < (2.5 * HV) then housing is affordable
If  HV / HI < (3.5 * HV) and > (2.5 * HV) then housing is somewhat affordable
If  HV / HI > (3.5 * HV) then housing is not affordable Where:
HV = median home value in a geographic area
Where
HI = median household income in the geographic area Formula 604

Fig. 6

SYSTEM AND METHOD FOR PROVIDING A COMMON DATA AND ANALYTIC FRAMEWORK FOR VALUATING FINANCIAL INSTRUMENTS AND PORTFOLIOS

This application claims the benefit of U.S. provisional application Ser. No. 06/342,852, filed on Dec. 28, 2001, and incorporated by reference.

FIELD OF THE INVENTION

The present invention relates to a system and method for assessing the capacity and/or potential of a geographic area to support various products and/or services and, in particular, financial products and/or services.

BACKGROUND OF THE INVENTION

Service providers, such as financial intermediaries and businesses, desire accurate information about the characteristics and demands of potential markets. These types of information enable the service providers to target their product and/or service offerings more effectively to markets of interest. Thus, service providers typically employ a number of marketing techniques and/or tools, such as researching publicly available information, conducting market research, commissioning surveys and employing third party systems that purport to identify potential markets, to identify marketing opportunities.

Prior to employing one or more of these marketing techniques and/or tools for identifying market opportunities, a service provider typically broadly defines a geographic area of interest. Thereafter, the service provider employs one or more techniques and/or tools and targets marketing efforts, such as a television, radio, mass mailing, and/or telephone campaign, to the defined geographic area. The effectiveness of these techniques and/or tools is limited at best, since their implementations are usually based on weak identification of the potential market. Additionally, market research and other techniques implemented with statistical data is subject to limitations based on the statistical validity of the sampled data.

The cost and efficacy of these marketing techniques and tools also vary widely. Additionally, many of tools, such as the third party systems, are not targeted to a specific business, but are typically marketed to all types businesses. As such, these tools frequently fail to target markets that are most appropriate for specific businesses. Third party systems provide only an engine to map data and do not provide analytic tools or models for analyzing the data. Moreover, third party systems, specifically third party mapping systems, are also subject to statistical variability and are inherently limited by the quality of the data upon which statistical models in the systems are based.

The information obtained from these marketing techniques and tools is often difficult to analyze. Currently, most demographic information employed in marketing techniques and tools is generally available on the bases of a Metropolitan Statistical Area. For example, the Washington, D.C. Metropolitan Statistical Area includes twenty-seven counties, many with widely divergent characteristics and demographics. Therefore, without customized analysis, the information obtained from these Metropolitan Statistical Areas is insufficient to enable specific businesses to target products and/or services effectively to likely receptive markets. Demographic information may also be obtained from national census data. However, this data is updated once every ten years and is frequently out of date.

Therefore, substantial resources are typically expended on marketing techniques and tools to reach individuals who are not likely to be interested in the products and/or services offered by specific businesses. Furthermore, the rate at which a campaign reaches potential interested consumers is relatively low. As a result, many marketing efforts are scattershot approaches that are not well-focused. Current marketing techniques and tools also increase the cost but do not necessarily increase the effectiveness of marketing efforts.

SUMMARY OF THE INVENTION

The present invention is a system for determining the capacity of a geographic area to support a specific product by identifying an index of variables associated with potential buyers in the geographic area. The system includes a data gathering component and a processing component. The data gathering component obtains a profile about the product and additional information about similar products from several sources. The additional information includes identified characteristics of potential buyers. The processing component processes the data by identifying variables that characterize potential buyer, assigns a score to each variable, assigns the variables to the index, determines a formula for the index, executes the formula against information associated with the geographic area, divides the geographic area into sub-groups and analyzes each sub-group to determine the capacity of the geographic area to support the product.

The inventive system specifically determines the capacity of a geographic area to support a specific product by obtaining a profile about the product; using the profile to identify variables that characterize potential buyers, obtaining additional information with identified characteristics of desired customers of the product; conducting statistical techniques on the additional information to determine which variables are major factors for the product; assigning a statistical score to each variable and determining which variables have a high correlation to the profile; storing the variables in an index and weighing each variable based on the statistical score and the correlation of the variable to the profile; determining a formula for the index; executing the formula against information associated with the geographic area; and dividing the geographic area into sub-groups and assigning a score to each sub-group based on the number of variables in the sub-group with a high correlation to the profile, wherein each sub-group is analyzed to determine the capacity of the geographic area to support the product.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for determining the capacity of a geographic area to support various financial products and/or services.

Figure 1:
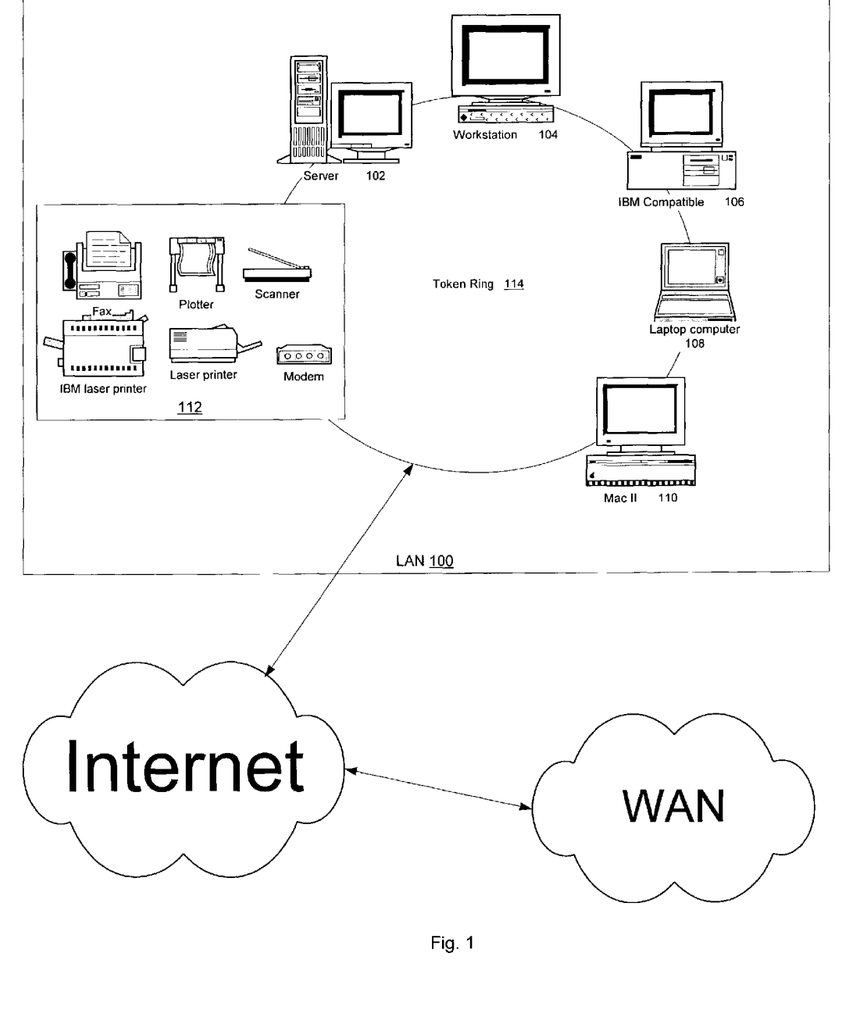
FIG. 1 is illustrates a local area network that is configured to access the capacity of a geographic area for a specific product and/or service.

FIG. 1 illustrates a local area network (LAN) 100 that is configured to determine the capacity of a geographic area to support a specific product and/or service. LAN 100 comprises a server 102, four computer systems 104-110, and peripherals, such as printers and other devices 112, that may be shared by components on LAN 100. Computer system 104-110 may serve as clients for server 102 and/or as clients and/or servers for each other and/or for other components connected to LAN 100. Components on LAN 100 are preferably connected together by cable media, for example copper or fiber-optic cable and the network typology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

LAN 100 also may be connected to other computer networks, such as the Internet, other LANs or Wide Area Networks (WAN). However, it should also be obvious to one skilled in the art that the invention may be practiced on a single processor that is not part of a computer network. The computer processor for executing the inventive system and method, for example server 102 and/or computer systems 104-110, include electronic storage media, such as disks, for storing programming code and data structures used to implement the inventive method and outputs therefrom. The invention uses a computer system, for example computer system 104, to implement an inventive application for determining variables correlating to a product and/or service to determine the capacity of a geographic area for the product and/or service. Note that any computer system may be configured to implement the inventive method and computer system 104 is only used for exemplary purpose.

Figure 2:
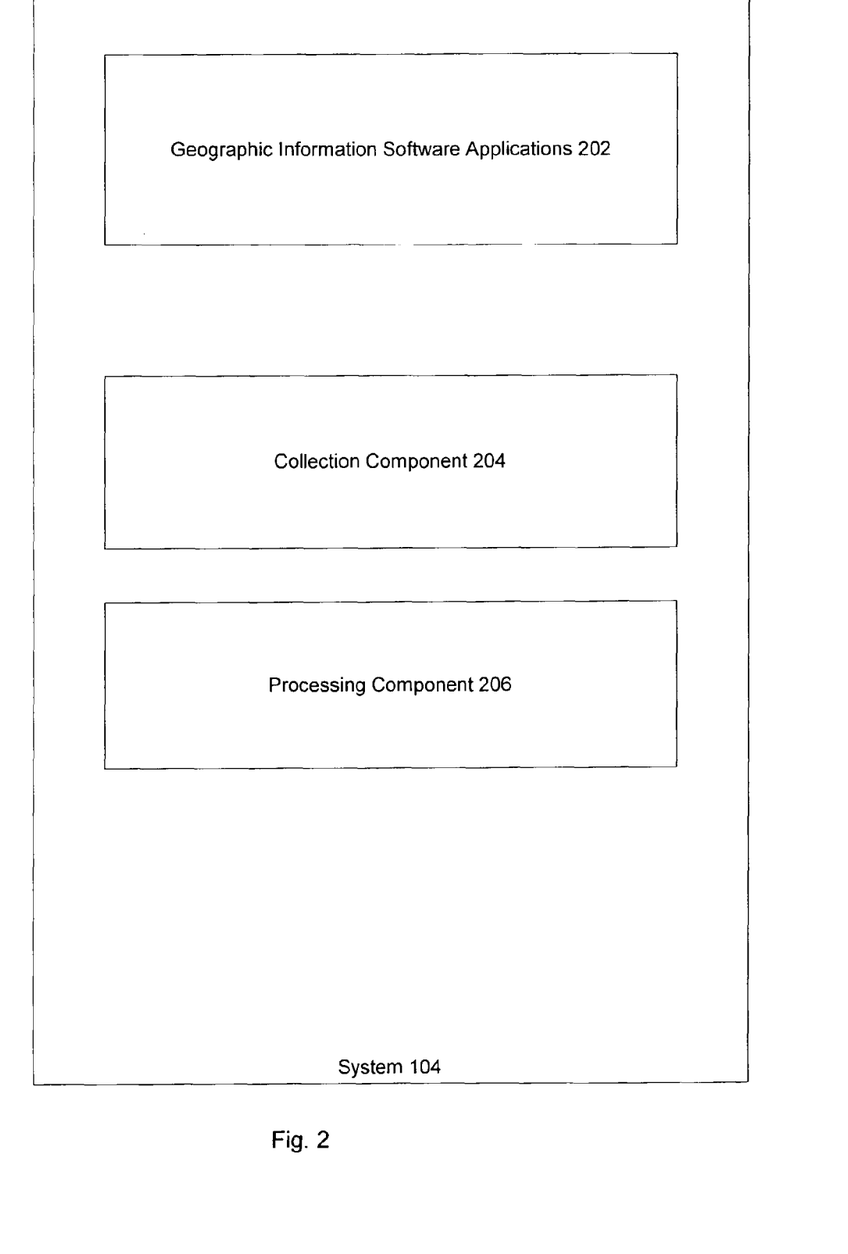
FIG. 2 illustrates components used in the computer system to identify desired users of specific products and/or services.

FIG. 2 illustrates components used in computer system 104 to identify desired users of specific products and/or services. Computer system 104 includes one or more geographic information software applications 202, a collection component 204 and a processing component 206. Geographic information software applications 202 may be external systems, such as MapInfo or Claritas, that are used to prepare maps based on data associated with desired regions. Collection component 204 obtains data about the product and/or service from external sources. Processing component 206 implements statistical analysis against data collected by collection component 204, assigns variables to the collected data and correlates the variables to the collected data. Note that while collection component 204 and processing component 206 are illustrated as separate components, in other embodiments of the invention all or some functions performed by components 204 and 206 may be processed by one component.

In a preferred embodiment, collection component 204 obtains a profile of a product and/or service, such as a loan, to determine the characteristics of a typical and/or desired purchaser. Collection component 204 may obtain the profile through information supplied by external sources, such as a consultant, a market research group or a third party. As is obvious to one skilled in the art, the collection component 204 also may obtain the profile by employing internal and/or external software systems or other electronic means. Upon obtaining the profile, processing component 206 identifies variables that characterize desired purchasers of the product and/or service. For example, variables that characterize desired home buyers include the age, income, gender, current residence (single family or multi-family house), length of residence, tenure of household (home owner or renter), status (borrower or co-borrower), race, median house value in the area of current residence, and median household income in the area of current residence, among others.

Thereafter collection component 204 accesses external sources and extracts information with predefined characteristics of desired purchasers of the product and/or services. Examples of external sources include the National Association of Realtors Home Buyer and Seller Survey, Chicago Title and Trust Home Buyer's Survey, and U.S. Department of Housing and Urban Development Home Mortgage Disclosure Act Data, among others. Processing component 206 conducts appropriate statistical techniques, such as regression analysis, on the external information. The statistical techniques are used to determine relations and relevance between the identified variables and each product and/or service. Upon executing the statistical technique, processing component 206 assigns a statistical score to each variable, validates the output from the statistical technique by correlating the scored variables with the profile that characterizes the product and/or service and identifies those variables with a high correlation with the profile. Processing component 206 then stores the variables in an index and weighs each variable in the index based on the statistical score assigned to the variable and the correlation between the variable and the profile. In a preferred embodiment of the invention, weights for each variable may be adjusted for various factors. In an embodiment of the invention, variables with the highest weight are preferably those defined to be closely correlated to the profile characterizes the product and/or service. Processing component 206 compares the weight for each variable with data extracted from the external sources to ensure the accuracy of the weight assigned to each variable.

Thereafter, processing component 206 determines a formula for the index of variables and stores the formula in system 104. Processing component 206 sets ranges for each variable based on the correlation between the variable and the profile. Ranges may also be set by users of system 104. Processing component 206 then executes the formula against maps obtained from geographic information software applications 202. Processing component 206 divides the maps into tracks and assigns a score to each track. The score for each track is determined by the number of desired purchasers in the track. Processing component 206 also divides the maps into quantiles and sorts the tracks in descending order, whereby the tracks with the highest scores are assigned to the first quantile and so on. Processes component 206 then analyzes each quantile to determine the number of desired customers in a geographic area for a specific product and/or service.

Figure 3:
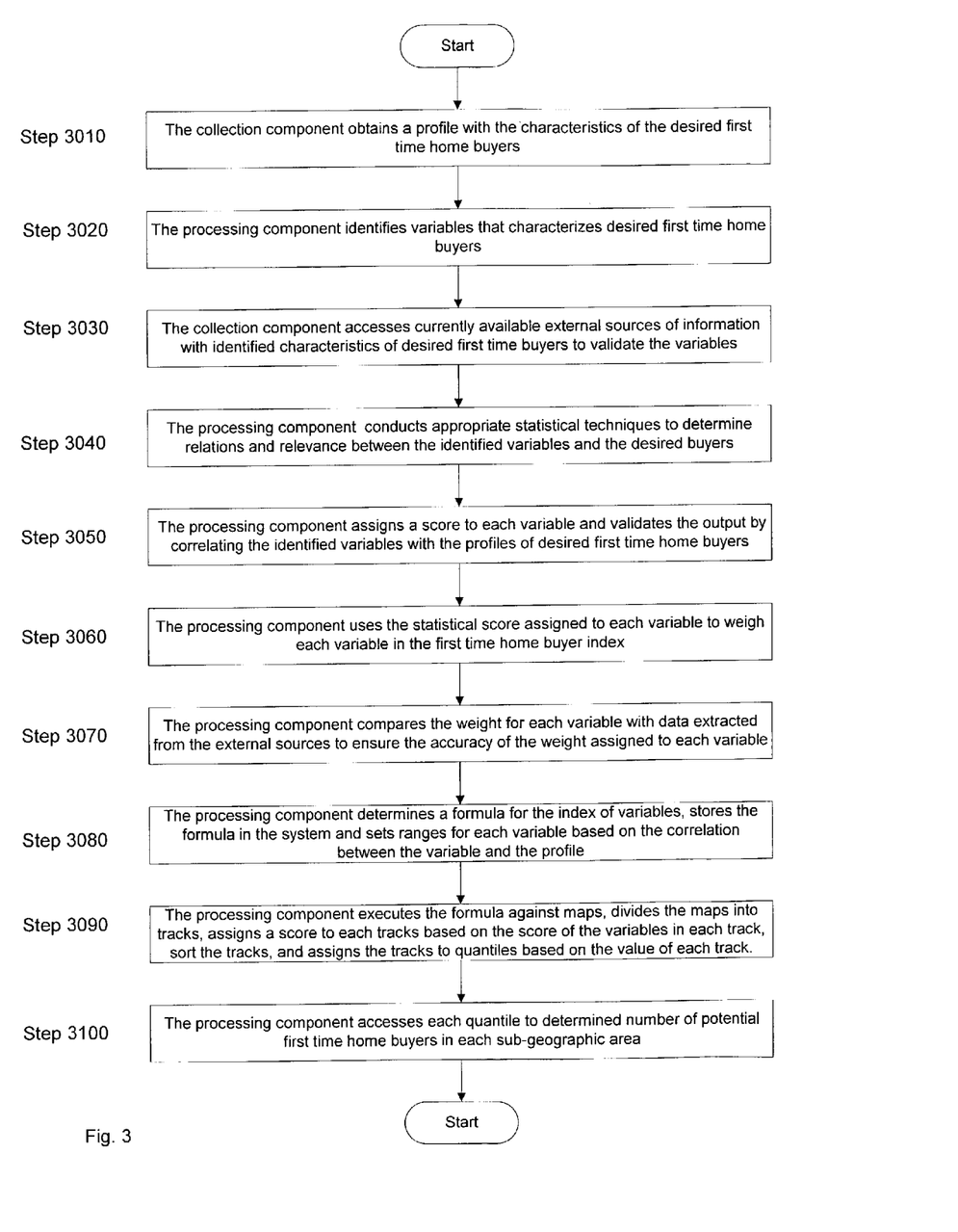
FIG. 3 illustrates the steps implemented in applying the inventive system to a sub-geographic area to determine desired buyers of a product and/or service.

FIG. 3 illustrates the steps implemented in applying the inventive system to a sub-geographic area to determine desired buyers of a product or service. The steps in FIG. 3 specifically identify households headed by young adults with adequate financial means to purchase a first home. In Step 3010, collection component 204 obtains a profile with the characteristics of the desired first time home buyers. In Step 3020, processing component 206 identifies variables that characterize desired first time home buyers. For example, variables that characterize desired first time home buyers include the number of households in a geographic area of interest between predefined ages and/or with predefined income levels, the total number of households in a geographic area, and the number of renter-occupied units in the geographic area.

In Step 3030, collection component 204 accesses currently available external sources of information with identified characteristics of desired first time buyers to validate the variables. In Step 3040, processing component 206 conducts appropriate statistical techniques to determine relations and relevance between the identified variables and the desired buyers. In Step 3050, processing component 206 assigns a score to each variable and validates the output by correlating the identified variables with the profiles of desired first time home buyers. In Step 3060, processing component 206 uses the statistical score assigned to each variable to weigh each variable in the first time home buyer index. In Step 3070, processing component 206 compares the weight for each variable with data extracted from the external sources to ensure the accuracy of the weight assigned to each variable.

In Step 3080, processing component 206 determines a formula for the index of variables, stores the formula in system 104 and sets ranges for each variable based on the correlation between the variable and the profile. In Step 3090 processing component 206 executes the formula against maps obtained from geographic information software applications 202, divides the maps into tracks, assigns a score to each track based on the score of the variables in each track, sort the tracks, and assigns the tracks to quantiles based on the value of each track. In Step 3100, processing component 206 accesses each quantile to determine the number of potential first time home buyers in each sub-geographic area.

Figure 4:
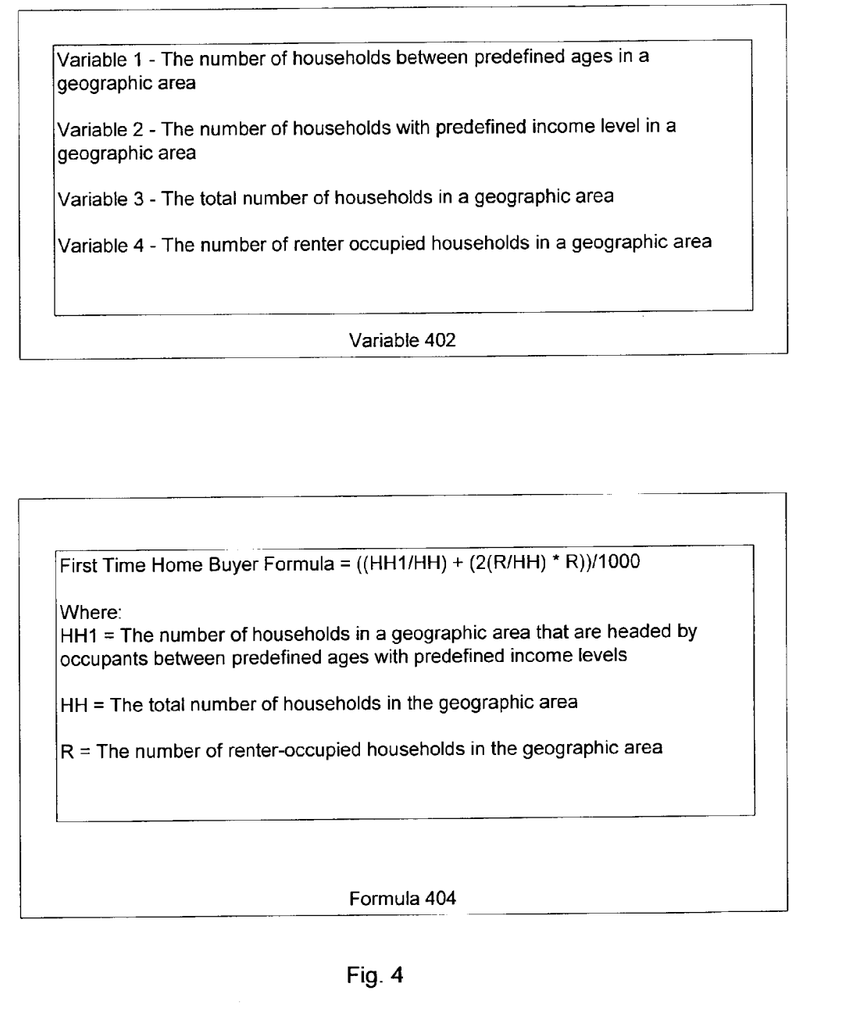
FIG. 4 illustrates the variables and formula used to create a first time home buyer index for a sub-geographic area.
Figure 5:
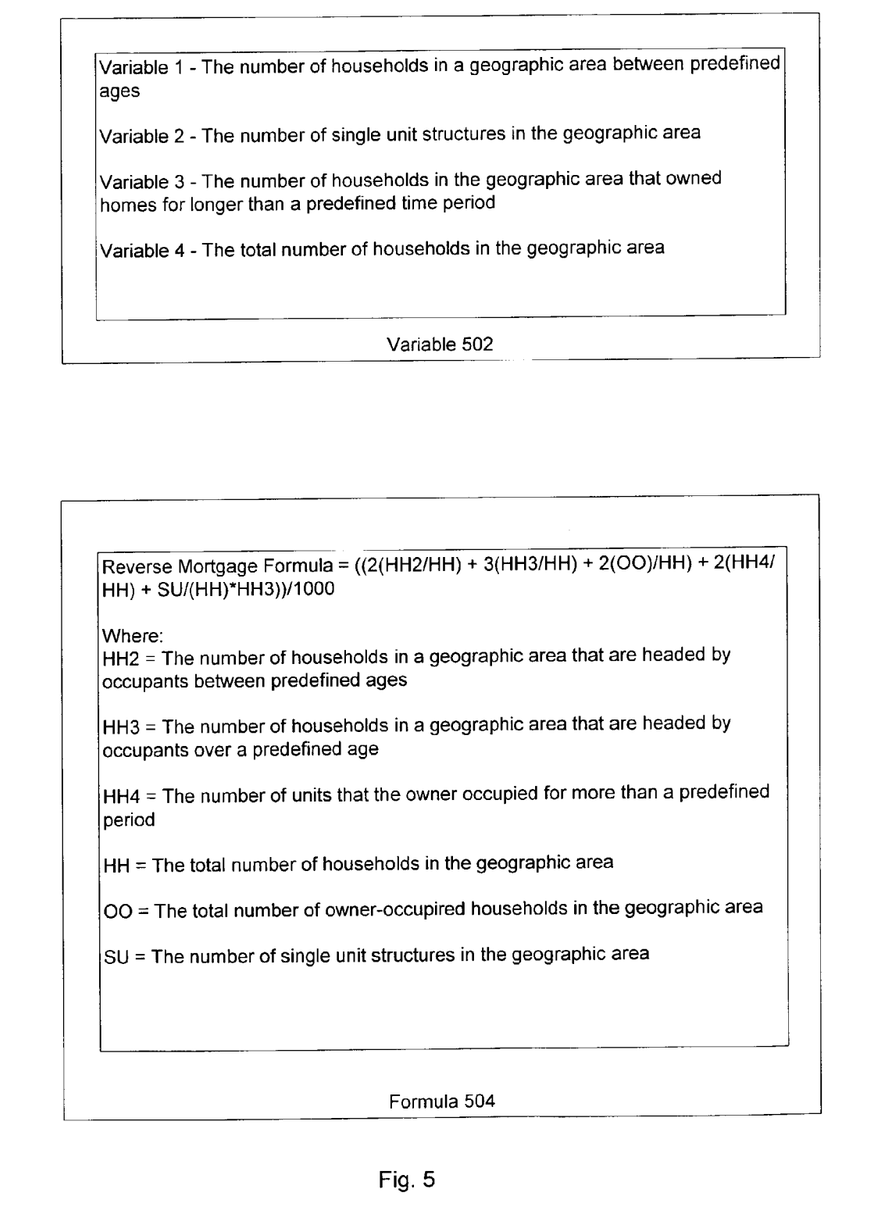
FIG. 5 illustrates the variables and formula used to create a second mortgage rehabilitation opportunity index for a sub-geographic area.

FIG. 4 illustrates the variables 402 and formula 404 used to create a first time home buyer index for a sub-geographic area. FIG. 5 illustrates the variables 502 and formula 504 used to create a second mortgage rehabilitation opportunity index for a sub-geographic area. Second mortgage products and/or services are provided to support rehabilitation of a property and are particularly attractive to certain homeowners. For example, homeowners who desire unique properties with certain architectural features in a sub-geographic area. According to the invention, processing component 206 identifies variables 502 that characterize desired purchasers of second mortgage products and/or services. Collection component 204 accesses currently available external sources of information with identified characteristics of desired purchasers of second mortgage products and/or services to validate variables 502. Thereafter, processing component 206 conducts appropriate statistical techniques to determine relations and relevance between variables 502 and the desired buyers, assigns a score to each variable, validates the output by correlating variables 502 with the profiles of desired purchasers of second mortgage products and/or services, uses the statistical score assigned to each variable to weigh each variable in a second mortgage purchasers index, compares the weight for each variable with data extracted from the external sources to ensure the accuracy of the weight assigned to each variable, determines formula 504 for the index of variables, stores formula 504 in system 104 and sets ranges for each variable based on the correlation between the variable and the profile, executes formula 504 against maps associated with desired geographic areas, divides the maps into tracks, assigns a score to each track based on the score of the variables in each track, sorts the tracks, assigns the tracks to quantiles based on the value of each track, accesses each quantile to determine the number of desired purchasers of second mortgage products and/or services in each sub-geographic area.

Figure 6:
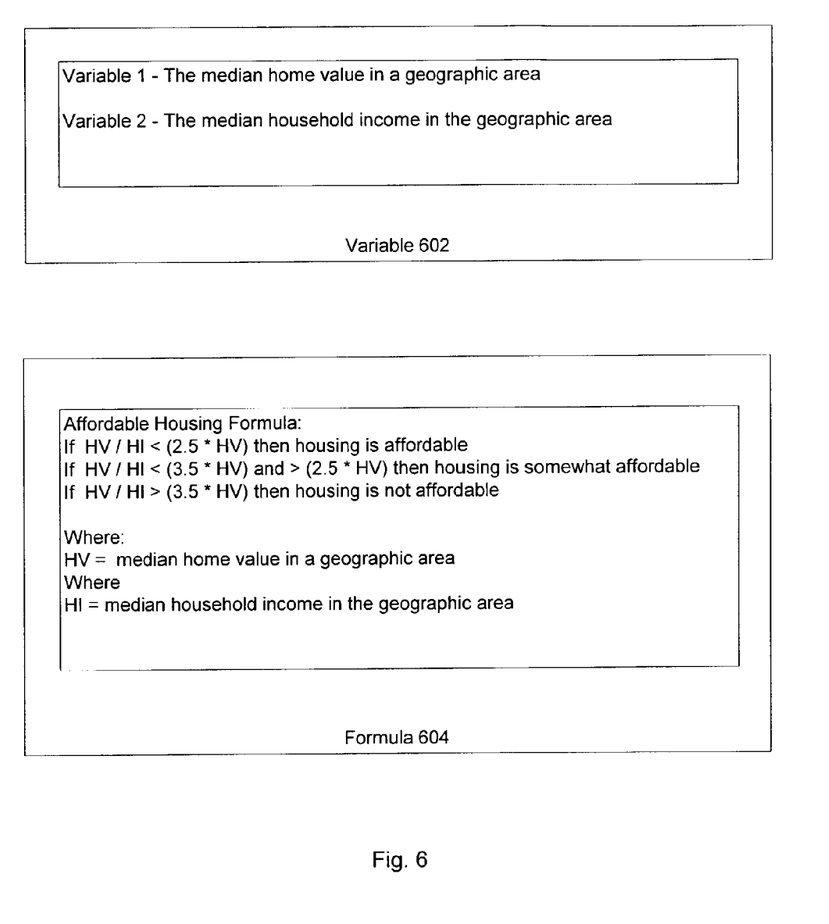
FIG. 6 illustrates the variables and formula used to create an affordable housing index for a sub-geographic area.

FIG. 6 illustrates the variables 602 and formula 604 used to create an affordable housing index for a sub-geographic area. The affordable housing index provides a basis for comparing the characteristics of a sub geographic area to a larger area. Processing component 206 identifies variables 602 that characterize affordable housing in a sub-geographic area. Collection component 204 accesses currently available external sources of information with identified characteristics of affordable housing in a sub-geographic area. Thereafter, processing component 206 conducts appropriate statistical techniques to determine relations and relevance between variables 602 and the affordable housing in a sub-geographic area, assigns a score to each variable, validates the output by correlating variables 602 with the profiles of affordable housing in a sub-geographic area, uses the statistical score assigned to each variable to weigh each variable in affordable housing index, compares the weight for each variable with data extracted from the external sources to ensure the accuracy of the weight assigned to each variable, determines formula 604 for index of variables 602, stores formula 604 in system 104, sets ranges for each variable based on the correlation between the variable and the profile, executes formula 604 against maps associated with desired sub-geographic areas, divides the maps into tracks, assigns a score to each track based on the score of the variables in each track, sorts the tracks, assigns the tracks to quantiles based on the value of each track, accesses each quantile to determine the number of affordable housing in a desired sub-geographic area.

As is apparent to one skilled in the art, other variables and formulas may be used with the inventive system and method to identify potential markets for specific products and/or services.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A computer implemented method for determining the capacity of geographic areas to support specific mortgage loan products by identifying indices of variables associated with potential buyers in the geographic areas, the method comprising the steps of:
   obtaining, by a computer, a profile for a mortgage loan product, the profile having characteristics of potential buyers of the mortgage loan product;

identifying, by a computer, variables that characterize desired buyers of the mortgage loan product from the profile;

obtaining, by a computer, additional information from another source and extracting identified characteristics of desired buyers of the mortgage loan product from the additional information;

performing, by a computer, a regression on the additional information to determine an extent to which the variables that characterize desired buyers of the mortgage loan product are correlated to the profile having characteristics of potential buyers of the mortgage loan product;

assigning, by a computer, a statistical score to each of the variables based upon the regression;

storing the variables in an index, in a computer memory, and weighing each of the variables based on the statistical score;

determining a formula for the index, wherein the formula implements the variables and quantifies a number for potential buyers of the mortgage loan product for any given geographical area based upon the statistical scores for the variables in the given geographical area;

executing, by a computer, the formula against information associated with the geographic area; and dividing the geographic area into sub-groups and assigning, by a computer, a sub-group score to each sub-group based on the number of variables in the sub-group that have a relatively high correlation to the profile, wherein each sub-group is analyzed to determine the capacity of the geographic area to support the mortgage loan product.

2. The method of claim 1, wherein weights in the index are adjustable.

3. The method of claim 1, wherein the weight assigned to each variable in the index is compared with information associated with similar products to ensure the accuracy of the weights in the index.

4. The method of claim 1, wherein ranges for each variable in the index are set based on the correlation between the variable and the profile.

5. The method of claim 1, wherein the information associated with the geographic area is a map of the geographic area.

6. The method of claim 1, wherein the map is divided into tracks, with a score is assigned to each track based on the number of variables with high correlation to the profile in the track, wherein the tracks are sorted and assigned to quintiles of the geographic area, and wherein each quintile is analyzed to determine the number of the desired buyers in the geographic area.

7. A computer program product, for determining the capacity of geographic areas to support specific mortgage loan products by identifying indices of variables associated with potential buyers in the geographic areas, the computer program product comprising a computer readable medium for storing computer-readable instructions that are configured to carry out steps comprising:

obtaining a profile for a mortgage loan product, the profile having characteristics of potential buyers of the mortgage loan product;

identifying variables that characterize desired buyers of the mortgage loan product from the profile;

obtaining additional information from another source and extracting identified characteristics of desired buyers of the mortgage loan product from the additional information;

performing a regression on the additional information to determine an extent to which the variables that characterize desired buyers of the mortgage loan product are correlated to the profile having characteristics of potential buyers of the mortgage loan product;

assigning a statistical score to each of the variables based upon the regression;

storing the variables in an index and weighing each of the variables based on the statistical score;

determining a formula for the index, wherein the formula implements the variables and quantifies a number for potential buyers of the mortgage loan product for any given geographical area based upon the statistical scores for the variables in the given geographical area;

executing the formula against information associated with the geographic area; and dividing the geographic area into sub-groups and assigning a sub-group score to each sub-group based on the number of variables in the sub-group that have a relatively high correlation to the profile, wherein each sub-group is analyzed to determine the capacity of the geographic area to support the mortgage loan product.

8. The computer program product of claim 7, wherein weights in the index are adjustable.

9. The computer program product of claim 7, wherein the weight assigned to each variable in the index is compared with information associated with similar products to ensure the accuracy of the weights in the index.

10. The computer program product of claim 7, wherein ranges for each variable in the index are set based on the correlation between the variable and the profile.

11. The computer program product of claim 7, wherein the information associated with the geographic area is a map of the geographic area.

12. The computer program product of claim 7, wherein the map is divided into tracks, with a score is assigned to each track based on the number of variables with high correlation to the profile in the track, wherein the tracks are sorted and assigned to quintiles of the geographic area, and wherein each quintile is analyzed to determine the number of the desired buyers in the geographic area.

13. A system for determining the capacity of geographic areas to support specific mortgage loan products by identifying indices of variables associated with potential buyers in the geographic areas, the system comprising:

means for obtaining a profile for a mortgage loan product, the profile having characteristics of potential buyers of the mortgage loan product;

means for identifying variables that characterize desired buyers of the mortgage loan product from the profile;

means for obtaining additional information from another source and extracting identified characteristics of desired buyers of the mortgage loan product from the additional information;

means for performing a regression on the additional information to determine an extent to which the variables that characterize desired buyers of the mortgage loan product are correlated to the profile having characteristics of potential buyers of the mortgage loan product;

means for assigning a statistical score to each of the variables based upon the regression;

means for storing the variables in an index and weighing each of the variables based on the statistical score;

means for determining a formula for the index, wherein the formula implements the variables and quantifies a number for potential buyers of the mortgage loan product for any given geographical area based upon the statistical scores for the variables in the given geographical area;

means for executing the formula against information associated with the geographic area; and means for dividing the geographic area into sub-groups and assigning a sub-group score to each sub-group based on the number of variables in the sub-group that have a relatively high correlation to the profile, wherein each sub-group is analyzed to determine the capacity of the geographic area to support the mortgage loan product.

14. The system of claim 13, wherein weights in the index are adjustable.

15. The system of claim 13, wherein the weight assigned to each variable in the index is compared with information associated with similar products to ensure the accuracy of the weights in the index.

16. The system of claim 13, wherein ranges for each variable in the index are set based on the correlation between the variable and the profile.

17. The system of claim 13, wherein the information associated with the geographic area is a map of the geographic area.

18. The system of claim 13, wherein the map is divided into tracks, with a score is assigned to each track based on the number of variables with high correlation to the profile in the track, wherein the tracks are sorted and assigned to quintiles of the geographic area, and wherein each quintile is analyzed to determine the number of the desired buyers in the geographic area.

* * * * *